United States Patent
Kwong et al.

(10) Patent No.: US 8,932,708 B2
(45) Date of Patent: Jan. 13, 2015

(54) ANTIMICROBIAL GAS GENERATING SYSTEM

(75) Inventors: Peter Kwong, Wheeling, IL (US); Andres de Witt H., Vitacura (CL)

(73) Assignee: Intellipack Quimas S.A., Maipú, Santiago (CL)

(*) Notice: Subject to any disclaimer, the term of this patent is extended or adjusted under 35 U.S.C. 154(b) by 449 days.

(21) Appl. No.: 11/873,575

(22) Filed: Oct. 17, 2007

(65) Prior Publication Data

US 2009/0104442 A1   Apr. 23, 2009

(51) Int. Cl.
| | |
|---|---|
| *B32B 27/00* | (2006.01) |
| *B65B 31/00* | (2006.01) |
| *C08K 3/06* | (2006.01) |
| *B32B 27/32* | (2006.01) |
| *A23B 4/16* | (2006.01) |
| *A23B 7/144* | (2006.01) |
| *B32B 27/18* | (2006.01) |
| *B65B 55/19* | (2006.01) |

(52) U.S. Cl.
CPC . *B32B 27/32* (2013.01); *A23B 4/16* (2013.01); *A23B 7/144* (2013.01); *B32B 27/18* (2013.01); *B32B 2250/03* (2013.01); *B32B 2250/242* (2013.01); *B32B 2264/10* (2013.01); *B32B 2270/00* (2013.01); *B65B 55/19* (2013.01)

USPC ............ 428/339; 428/323; 428/330; 524/418

(58) Field of Classification Search
USPC ................. 428/323, 330, 35.1, 36.9
See application file for complete search history.

(56) References Cited

U.S. PATENT DOCUMENTS

| | | |
|---|---|---|
| 4,384,972 A | 5/1983 | Nakamura et al. |
| 6,776,998 B1 | 8/2004 | Corrigan |
| 7,045,182 B2 | 5/2006 | Clemes et al. |
| 2004/0131518 A1 | 7/2004 | Santibanez et al. |
| 2005/0106380 A1* | 5/2005 | Gray et al. ............. 428/323 |
| 2006/0216496 A2 | 9/2006 | Gray et al. |

FOREIGN PATENT DOCUMENTS

| | | |
|---|---|---|
| EP | 1 197 441 A2 | 4/2002 |
| WO | 94/10233 A1 | 5/1994 |
| WO | WO 9410233 * | 5/1994 |
| WO | 00/03930 A1 | 1/2000 |
| WO | 03/028977 A1 | 4/2003 |
| WO | WO 03028977 * | 4/2003 |
| ZA | 9602517 A | 10/1996 |

* cited by examiner

*Primary Examiner* — Ronak Patel
(74) *Attorney, Agent, or Firm* — Fitch, Even, Tabin & Flannery, LLP

(57) ABSTRACT

Gas generating and releasing articles consisting essentially of a polymer and a gas generating solid dispersed therein are described. The article generates a controlled fast and followed by a slow release gas in response to moisture.

10 Claims, 2 Drawing Sheets

ANTIMICROBIAL GAS GENERATING SYSTEM

FIELD OF THE INVENTION

The present invention relates to a sulfur dioxide gas generating polymer or plastic articles formed by a multilayer coextrusion, not lamination. This coextrusion multilayer article can be used for film, sheets, liners, covers, pads, foams and bags, for preventing, retarding, controlling, delaying or killing microbiological contamination in foods, agricultural crops and botanicals.

BACKGROUND

Polymers and plastics are generally employed in agricultural product packaging to preserve desirable product traits such as freshness, taste, flavor, color and odor by functioning as a barrier against moisture, oxygen, carbon dioxide, ethylene, and odors. Inside the barrier an isolated, dynamic environment is created that changes with storage time and storage conditions, such as temperature. Products that contain high water content, such as melons, grapes, berries, meat, seafood, and dairy products, release trapped moisture that accumulates over time. Problematically, the packaged products are invariably contaminated by a residual, inoculated concentration of microbes or bioburden. The trapped high moisture atmosphere and availability of nutrients creates favorable conditions for rapid microbe growth and product spoilage.

Gases generating devices and compositions have been used during packing, transportation and storage of foods, agricultural crops and botanicals for protection from spoilage due to microbiological contamination from molds, fungus, viruses and bacteria. With the ever-increasing globalization of the food and agricultural industries, more products are being shipped greater distances than in the past. The result is extended transportation and storage times with the concomitant need for more effective preservation.

Sulfur dioxide gas has been found to be particularly well suited against mold and fungi and has been used extensively to control gray mould decay (*Botrytis cineria* sp) induced in packed grapes, berries, leeches, and other fresh produce as well as a proven antioxidant effectiveness against the browning process of green tissues present in fruit, vegetables and flowers.

SUMMARY OF THE INVENTION

The present invention is directed to a gas generating and gas releasing from a multilayer coextruded film. The present invention can provide a sulphur dioxide generator, which will maintain an acceptable sulphur dioxide concentration level inside a packaging container, a bag or liner for a period of weeks during shipping or for months if the agricultural crops and fresh produce are stored for late season sale.

The present invention is a multilayer coextrusion, not lamination, which provides a sulfur dioxide generator which includes two or more structural layers forming a film (≤15 mil thickness) or a sheet (≥15 mil thickness) of gas permeable material with an active substance incorporated in one or between them. The coextruded active substances includes a material dispersed therein which, in the presence of moisture, release sulphur dioxide gas.

The present invention is directed to a gas generating and gas releasing from a multilayer coextruded article consisting essentially of between 40% and 99.9% by weight of a polymer and between 0.1% and 70% by weight of a gas generating solid dispersed into the polymer matrix.

The present invention involves a multilayer coextruded article, which consists essentially of a multilayer polymeric film or sheet. The three layered film structure was conjoined by means of blown or cast film coextrusion (FIG. 1 blown & cast film coex.).

The present invention involves a multilayer coextrued film, the inner layer of the article being an olefin, such as a low density polyethylene (LDPE) having a density range of 0.89 to 0.93. The LDPE allows water vapor into the active layer thus to generate sulphur dioxide gas. The LDPE is also permeable and allows sulphur dioxide gas to transfer into the packed agricultural crops and produce. The sulfur dioxide gas provides for preventing, retarding, controlling, delaying or killing microbiological contaminated foods, agricultural crops and botanicals.

The middle layer of the invented film or sheet consists of a polymeric mixture with a moisture activated sulphur dioxide gas generating precursor salt. This salt consist of a particle size range from 1 micron to less than 16 microns dispersed in a polymer said LDPE. These small particle size salts in the present of moisture, will produce a fast release rate of sulfur dioxide gas up to 150 ppm per hour from 0.1 to 4 days for fast kill of *Botrytis Cinerea* sp, molds, bacteria, and spores. These salts include: sodium sulfite, sodium metabisulfite, sodium bisulfite which disperse in a polymer said LDPE. In addition, a colorant or dye may be added for aesthetic, light selection or light reducing effects.

The third layer of the invented film or sheet consists of a polymeric mixture with a moisture activated sulfur dioxide gas generating precursor salt. This salt consist of a particle size range from 16 micron to 80 microns dispersed in a polymer said LDPE. These larger particle size salts, in the present of moisture, will produce a much slower and sustained release rate of sulfur dioxide gas ranging from 0.1 to 8 ppm per hour for a longer period of up to 75 days or more to suppress the growth of *Botrytis Cinerea* sp, molds, bacteria, and spores. These salts include: sodium sulfite, sodium metabisulfite, sodium bisulfite which disperse in a polymer said LDPE. In addition, a colorant or dye may be added for aesthetic, light selection or light reducing effects. See FIG. 1 and FIG. 2.

DESCRIPTION OF THE PREFERRED STRUCTURAL LAYER COMPOSITION

In accordance with the present invention, a moisture activated gas releasing article has been made that comprises a polymer and a moisture activated solid component that is capable of generating and releasing a gas. The article provides antimicrobial protection of packaged agricultural products and is capable of sustained generation and release of a gas in the presence of moisture. The gas generally controls the growth of microorganisms thereby providing protection of agricultural products from those microorganisms during packing, transportation and storage.

In the first structural layer, the polymeric article of the invention comprises a polymer said low density polyethylene which has a density range of 0.89 to 0.93. A small percentage of processing aid can be added to the LDPE. The polymeric low density polyethylene film structure is permeable to moisture and sulphur dioxide gas. The generated gas is effective for permeating through into the agriculture product to control the growth of microorganisms.

In the second structural layer, the polymeric article of the invention comprises a polymer said low density polyethylene which has a density range of 0.89 to 0.93; and a dispersed solid component capable of generating a gas upon exposure to moisture. In this structural layer, it consists essentially of 40% to 99.9% by weight of a polymer and between 0.1% and 70% by weight of a gas generating solid with a particle size range from 1 micron to 15 microns which is dispersed in the polymer matrix. These salts are: for example, sodium sulfite, sodium metabisulfite, sodium bisulfite. In addition, a colorant or dye may be added for aesthetic, light selection or light reducing effects.

In the third structural layer, the polymeric article of the invention comprises a polymer said low density polyethylene which has a density range of 0.89 to 0.93. This structural layer, includes 40% to 99.9% by weight of a polymer and between 0.1% and 70% by weight of a gas generating solid with a particle size 16 microns to 80 microns which is dispersed in the polymer matrix. The larger particles in the polymeric matrix release sulfur dioxide gas in a much slower pace than the smaller particles, for example, for 75 days or more for continuous control the growth of microorganisms and moulds during shipping. (Storage conditions: −1° C. to +10° C., RH 80% to 99%)

Sodium Metabisulfite Master Batch Preparation

A master batch was prepared by adding low density polyethylene (LPDE) and sodium metabisulfite directly into a polymer extruder at LDPE: Na2MB weight ratio ranges of 60:40 and 40:60. The master batch was compounded, extruded, cut by a vented twin screw extruder and cut into pellets. The extrusion conditions were maintained below 175° C. and above 110° C. 0,1% to 3% processing aids such as amides can be used as an internal and external lubricant.

Three Layer Coextrusion Film Process

Figure 1:
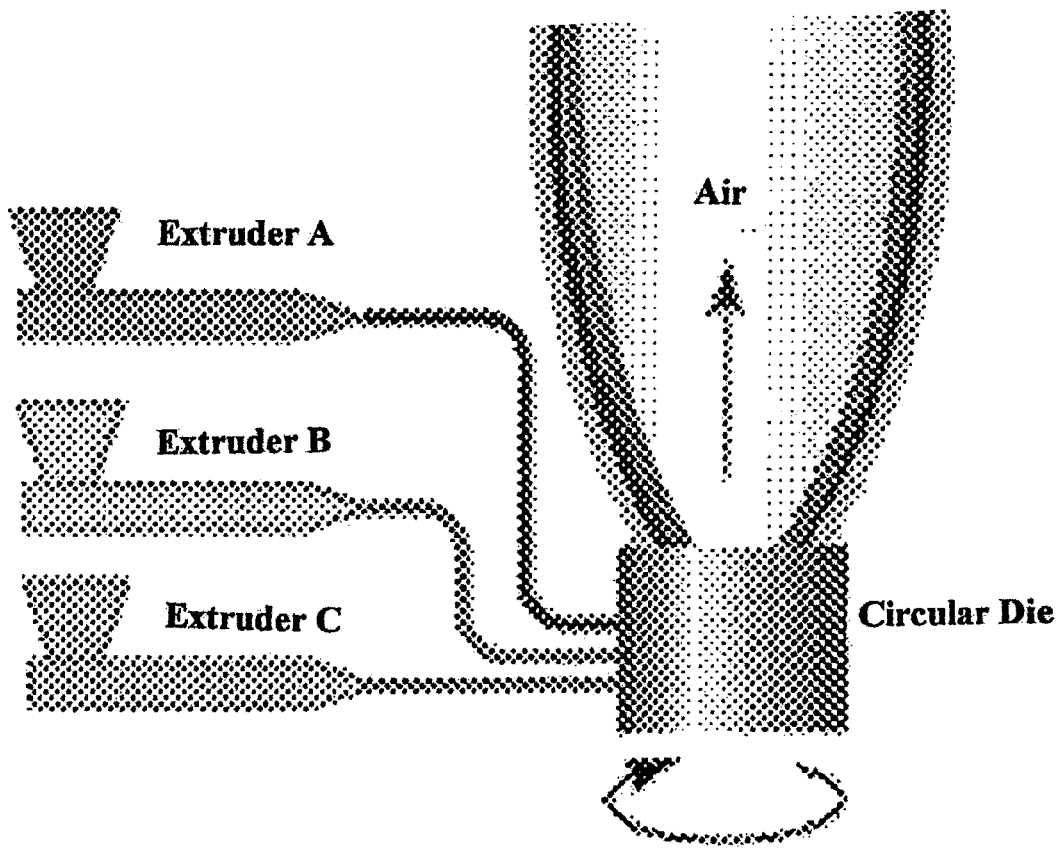
FIG. 1 illustrates the blown or cast film extrusion process.
Figure 2:
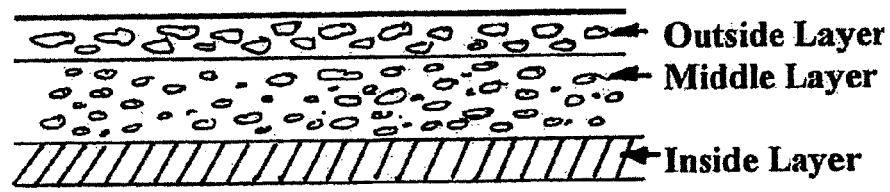
FIG. 2 shows a three layer film.
Figure 3:
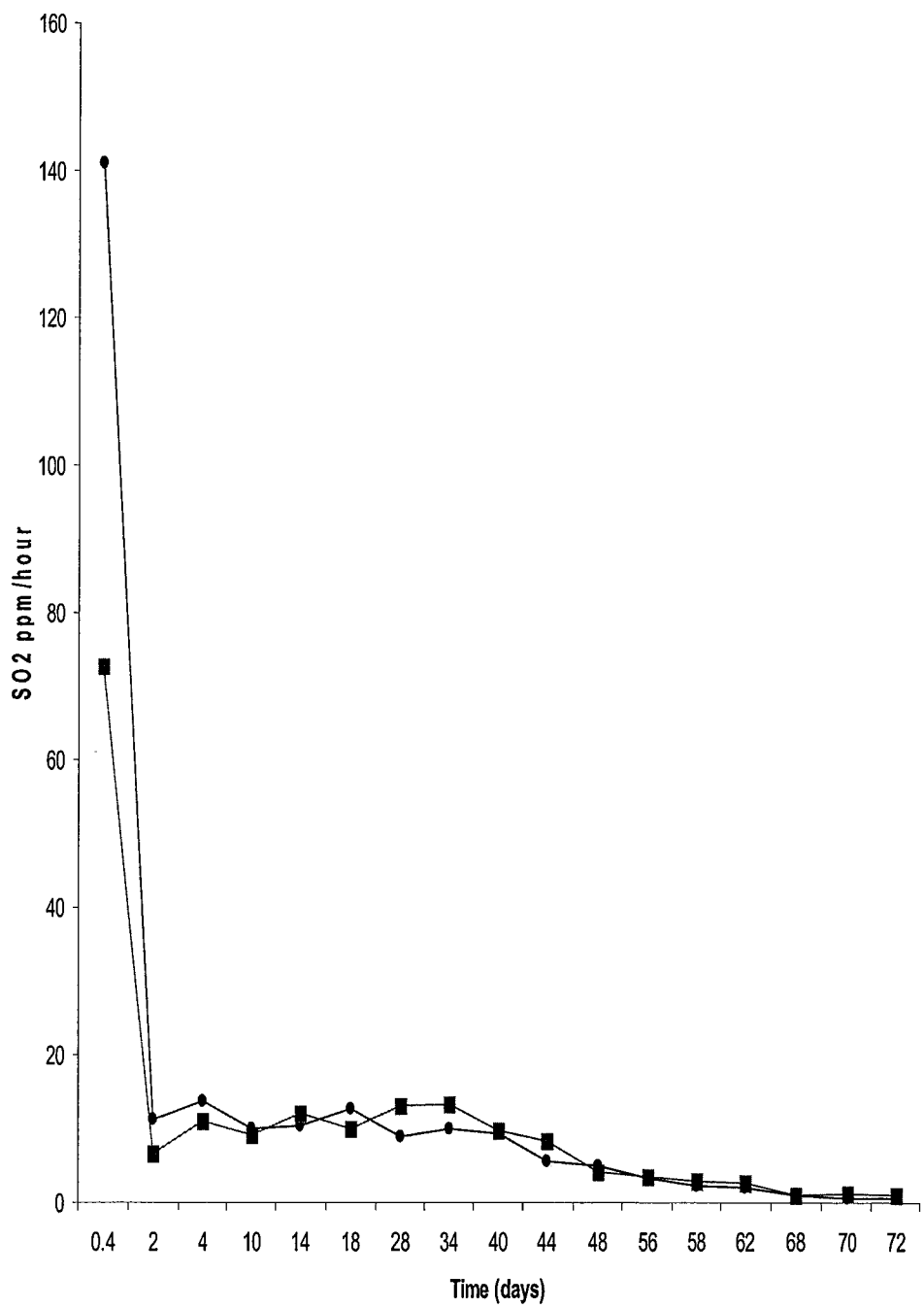
FIG. 3 shows $SO_2$ emission rate for two types of films.

The three layer film or sheet was prepared as follows: A first co-extruded inside layer containing 0% by weight of sodium metabisulfite was prepared by using a single screw extruder with all zones and die kept below 175° C. and above 110° C. by adding LPDE with a density of 0.89 to 0.93 LDPE. This co-extruded film or sheet was prepared using processes and equipment normally used in blown or cast film production (FIG. 2).

A second co-extruded middle layer containing 15% to 18% by weight of sodium metabisulfite master batch with a particle size of 0,1 micron to 15 microns was prepared by a blown film production equipment.

A third co-extrusion film was prepared by using a blown film production equipment by adding a master batch containing a 5% to 40% by weight of sodium metabisulfite. The master batch is a blend of sodium metabisulfite with particle size from 16 micron to 80 microns into 60 to 95% LDPE.

That which is claimed is:

1. A sulfur dioxide gas generating and gas releasing multi-layer, co-extrusion, tubular article comprising:
    a conjoined inner layer of low density polyethylene that is moisture-permeable and devoid of sulfur dioxide gas-generating solids and that forms the interior surface of said tubular extrusion;
    a conjoined middle layer that includes a low density polyethylene polymer containing between 0.1% and 70% by weight of sulfur dioxide gas-generating solid particles dispersed throughout the polymer, the gas-generating solid particles having a particle size of 1 to 15 microns which will generate fast sulfur dioxide release; and
    a conjoined outer layer that includes a low density polyethylene polymer containing between 0.1% and 70% by weight of sulfur dioxide gas-generating solid particles dispersed throughout the polymer, the gas-generating solid particles having a particle size of 16 to 80 microns which will generate slow sulfur dioxide release over at least 75 days at a temperature of 10° C. or below,
    wherein the low density polyethylene polymers have a density of 0.89 to 0.93 g/cm$^3$, and
    wherein the multi-layer co-extrusion tubular article is not greater than 15 mil (0.381 mm) thick, wherein size of the solid particles, the thickness of the layers, the density of the polymers, and the thickness of the tubular article are effective to provide release of sulfur dioxide gas by a release reaction between water vapor and the sulfur dioxide generating solid particles which reaction initially generates a fast release of sulfur dioxide gas followed by a slow release of sulfur dioxide gas to provide microbial control within the tubular article when it is in use as packaging for food.

2. The article of claim 1 wherein the sulfur dioxide gas-generating solid is a sulfur dioxide gas generating and releasing salt selected from the group consisting of sodium bisulfite, sodium metabisulfite, sodium sulfite and mixtures thereof.

3. The article of claim 1 wherein the low density polyethylene polymers are formed from resins having a melt temperature between 100° C. and 150° C.

4. The article of claim 1 wherein the middle layer is effective for providing a fast release of sulfur dioxide gas of up to 150 ppm per hour for 0.1 to 4 days and the outer layer is effective for providing a slow release of sulfur dioxide gas of 0.1 to 8 ppm per hour over a period of at least 75 days.

5. The article of claim 1 wherein the inner layer is effective to prevent the formation of salt crystal deposits on the interior surface of the tubular co-extrusion after generation and release of sulfur dioxide gas.

6. A sulfur dioxide gas generating and gas releasing multi-layer, co-extruded, flattened tubular article comprising:
    a conjoined inner layer of low density polyethylene that is moisture-permeable and devoid of sulfur dioxide gas-generating solids and that forms the interior surface of said tubular extrusion;
    a conjoined middle layer that includes a low density polyethylene polymer containing between 15% and 18% by weight of sulfur dioxide gas-generating solid particles dispersed throughout the polymer, the sulfur dioxide gas-generating solid particles having a particle size of 0.1 to 15 microns which upon exposure to moisture will generate fast release of sulfur dioxide gas at a rate of up to 150 ppm/per hour for a period of 0.1 to 4 days; and
    a conjoined outer layer that includes a low density polyethylene polymer containing between 5% and 40% by weight of sulfur dioxide gas-generating solid particles dispersed throughout the polymer, the sulfur dioxide gas-generating solid particles having a particle size of 16 to 80 microns which upon exposure to water vapor will generate slow release of sulfur dioxide gas at a rate of 0.1 to 8 ppm per hour for at least 75 days at a temperature of 10° C. or below,
    wherein the low density polyethylene polymers have a density of 0.89 to 0.93 g/cm$^3$, and
    wherein the multi-layer co-extruded tubular article is not greater than 15 mil (0.381 mm) thick, wherein size of the solid particles, the thickness of the layers, the density of the polymers, and the thickness of the tubular article are effective to provide release of sulfur dioxide gas by a release reaction between water vapor and the sulfur dioxide generating solid particles which reaction initially generates the fast release of sulfur dioxide gas at a rate of up to 150 ppm/per hour for a period of 0.1 to 4 days and generates the slow release of sulfur dioxide gas at a rate of 0.1 to 8 ppm per hour for at least 75 days at a temperature of 10° C. or below to provide microbial control within the tubular article when it is in use as packaging for food.

7. The article of claim 6 wherein the inner layer effectively prevents salt crystals from forming and depositing on the interior surface of said tubular article after generation and release of sulfur dioxide gas.

8. The article of claim 6 wherein the gas-generating solid is a sulfur dioxide gas generating and releasing salt selected from the group consisting of sodium bisulfite, sodium metabisulfite, sodium sulfite and mixtures thereof.

9. The article of claim 6 wherein the low density polyethylene polymers are formed from resins having a melt temperature between 100° C. and 150° C.

10. A sulfur dioxide gas generating and gas releasing multi-layer, co-extruded, flattened tubular article comprising:
   a conjoined inner layer of low density polyethylene that is moisture-permeable and devoid of gas-generating solids and that forms the interior surface of said tubular extrusion;
   a conjoined middle layer that includes a low density polyethylene polymer containing between 15% and 18% by weight of sulfur dioxide gas-generating solid particles of sodium metabisulfite dispersed throughout the polymer, the sulfur dioxide gas-generating solid particles having a particle size of 0.1 to 15 microns which upon exposure to water vapor will generate fast release of sulfur dioxide gas at a rate of up to 150 ppm/per hour for a period of 0.1 to 4 days by virtue of reactants consisting essentially of the sulfur dioxide generating gas generating solid particles and water vapor; and
   a conjoined outer layer that includes a low density polyethylene polymer containing between 5% and 40% by weight of sulfur dioxide gas-generating solid particles of sodium metabisulfite dispersed throughout the polymer, the sulfur dioxide gas-generating solid particles having a particle size of 16 to 80 microns which upon exposure to water vapor will generate slow release of sulfur dioxide at a rate of 0.1 to 8 ppm per hour for at least 75 days at a temperature of 10° C. or below by virtue of reactants consisting essentially of the sulfur dioxide gas generating solid particles and water vapor,
   wherein the multi-layer co-extruded tubular article is not greater than 15 mil (0.381 mm) thick, wherein size of the solid particles, the thickness of the layers, the density of the polymers, and the thickness of the tubular article are effective to provide release of sulfur dioxide gas by a release reaction between water vapor and the sulfur dioxide generating solid particles which reaction initially generates the fast release of sulfur dioxide gas at a rate of up to 150 ppm/per hour for a period of 0.1 to 4 days and generates the slow release of sulfur dioxide gas at a rate of 0.1 to 8 ppm per hour for at least 75 days at a temperature of 10° C. or below to provide microbial control within the tubular article when it is in use as packaging for food.

\* \* \* \* \*